(12) United States Patent
Lee et al.

(10) Patent No.: US 9,217,449 B2
(45) Date of Patent: Dec. 22, 2015

(54) OUTDOOR UNIT BRACKET AND OUTDOOR UNIT COMPRISING THE SAME

(71) Applicants: Jungwoo Lee, Seoul (KR); Kidong Kim, Seoul (KR)

(72) Inventors: Jungwoo Lee, Seoul (KR); Kidong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 13/644,533

(22) Filed: Oct. 4, 2012

(65) Prior Publication Data

US 2013/0092351 A1 Apr. 18, 2013

(30) Foreign Application Priority Data

Oct. 6, 2011 (KR) .................. 10-2011-0101747

(51) Int. Cl.
*F24F 1/62* (2011.01)
*F16B 1/00* (2006.01)
*F28F 9/007* (2006.01)

(52) U.S. Cl.
CPC ... *F16B 1/00* (2013.01); *F24F 1/62* (2013.01); *F28F 9/007* (2013.01)

(58) Field of Classification Search
CPC ... F28F 9/007; F28F 2275/14; F28F 2280/02; F28F 2280/105; F24F 1/62; F16B 1/00
USPC .............. 165/47, 53, 67, 76; 62/263
See application file for complete search history.

(56) References Cited

U.S. PATENT DOCUMENTS

| | | | | |
|---|---|---|---|---|
| 767,232 A * | 8/1904 | McClung | ............... | 312/101 |
| 953,803 A * | 4/1910 | Sellers | ............... | 312/101 |
| 5,191,770 A * | 3/1993 | Kim | ............... | 62/263 |
| 5,697,226 A * | 12/1997 | Marchesi | ............... | 62/263 |
| 6,145,334 A * | 11/2000 | Mochizuki et al. | ............... | 62/262 |
| 6,354,555 B1* | 3/2002 | Nishizuka et al. | ............... | 248/544 |
| 2008/0060577 A1* | 3/2008 | Call et al. | ............... | 118/504 |

FOREIGN PATENT DOCUMENTS

| | | |
|---|---|---|
| EP | 1 914 484 | 4/2008 |
| JP | 09-229428 | 9/1997 |
| JP | 10-227491 | 8/1998 |
| JP | 11-270881 | 10/1999 |
| JP | 2000-146229 | 5/2000 |
| KR | 20-0220988 | 5/2001 |

OTHER PUBLICATIONS

Korean Office Action dated Jun. 28, 2013.
Korean Office Action dated Jan. 9, 2013.
European Search Report dated Jan. 21, 2013.

* cited by examiner

*Primary Examiner* — Tho V Duong
(74) *Attorney, Agent, or Firm* — Ked & Associates LLP

(57) ABSTRACT

An outdoor unit bracket and an outdoor unit comprising the same, which can ensure safe and simple installation, are provided. The outdoor unit bracket includes an outer wall coupling portion, an upper supporting portion, an outer wall contacting portion, and a lower supporting portion. The outer wall coupling portion is coupled to the outer wall of the building. The upper supporting portion is coupled to a rear upper portion of the outdoor unit, being spaced apart from the outer wall coupling portion in a horizontal direction with respect to the outer wall of the building. The outer wall contacting portion contacts the outer wall of the building, being spaced apart from the outer wall coupling portion below the outer wall coupling portion. The lower supporting portion contacts a rear lower portion of the outdoor unit, being spaced apart from the outer wall contacting portion in the horizontal direction with respect to the outer wall of the building.

12 Claims, 4 Drawing Sheets

(a)

(b)

(c)

(d)

OUTDOOR UNIT BRACKET AND OUTDOOR UNIT COMPRISING THE SAME

BACKGROUND OF THE INVENTION

1. Field of the Invention

The present invention relates to an outdoor unit bracket and an outdoor unit comprising the same. More specifically, the present invention relates to an outdoor unit bracket and an outdoor unit comprising the same, which can ensure safe and simple installation.

2. Description of the Conventional Art

In general, an air conditioner is a device that cools or heats the interior of a room using a cooling cycle including a compressor, an outdoor heat exchanger, an expansion valve and an indoor heat exchanger. That is, the air conditioner may be used as a cooler for cooling the interior of the room or a heater for heating the interior of the room. The air conditioner may be used as a cooling/heating air conditioner for heating or cooling the interior of the room.

The air conditioner is generally classified into a window type and a separate or split type. The window type and the separate or split type are functionally equal to each other. However, in the case of the window type, an integrated function of cooling and heat radiation is provided to a device, and the device is directly installed by drilling a hole in a wall of a house or by hanging the apparatus on a window. In the case of the separate or split type, an indoor unit having an indoor heat exchanger is installed indoor, and an outdoor unit having a compressor and an outdoor heat exchanger is installed outdoor, thereby connecting the two devices separated from each other through a refrigerant pipe.

The outdoor unit may also be installed on an outer wall of a building using a bracket. It is very dangerous and difficult to attach the bracket to the outer wall of the building. Further, it is dangerous and difficult to mount the outdoor unit on the bracket.

SUMMARY OF THE INVENTION

The invention has been made in an effort to provide an outdoor unit bracket and an outdoor unit comprising the same, which can ensure safe and simple installation.

It is to be understood that technical problems to be solved by the present invention are not limited to the aforementioned technical problems and other technical problems which are not mentioned will be apparent from the following description to the person with an ordinary skill in the art to which the present invention pertains.

An outdoor unit bracket for supporting an outdoor unit of an air conditioner, being installed on an outer wall of a building, includes an outer wall coupling portion coupled to the outer wall of the building; an upper supporting portion coupled to a rear upper portion of the outdoor unit, being spaced apart from the outer wall coupling portion in a horizontal direction with respect to the outer wall of the building; an outer wall contacting portion contacting the outer wall of the building, being spaced apart from the outer wall coupling portion below the outer wall coupling portion; and a lower supporting portion contacting a rear lower portion of the outdoor unit, being spaced apart from the outer wall contacting portion in the horizontal direction with respect to the outer wall of the building.

An outdoor unit according to the present invention includes an outdoor unit main body performing heat exchange between outdoor air and a refrigerant; a flange provided at a rear upper portion of the outdoor unit main body; and an outdoor unit bracket supporting the outdoor unit main body, wherein an upper end of the outdoor unit bracket is coupled to the flange and a lower end of the outdoor unit bracket supports the outdoor unit main body while contacting a rear lower portion of the outdoor unit main body.

Detailed items of other embodiments are included in detailed description and drawings.

DETAILED DESCRIPTION OF THE PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
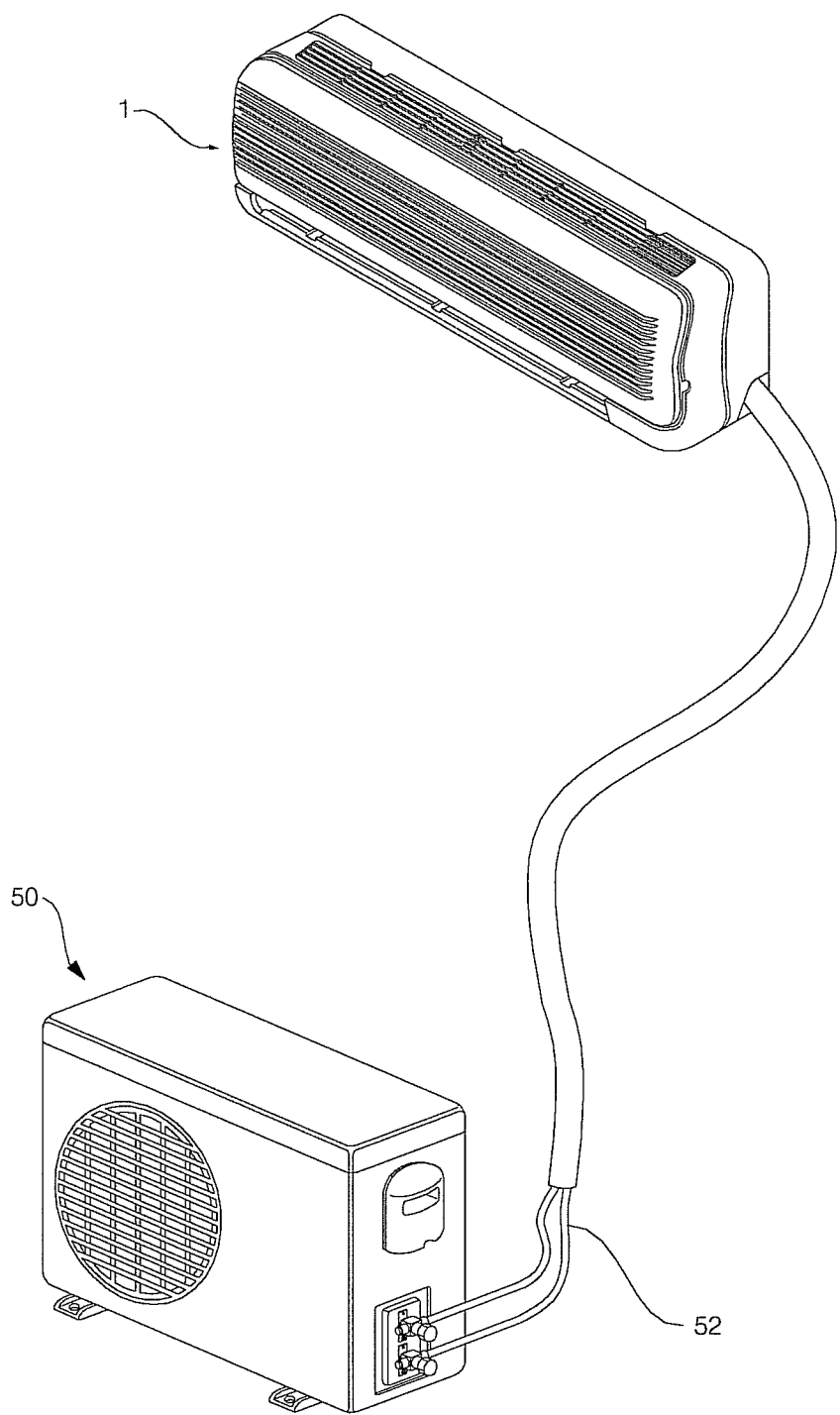
FIG. 1 is a configuration view of an air conditioner according to an embodiment of the present invention.

FIG. 1 is a configuration view of an air conditioner according to an embodiment of the present invention.

The air conditioner according to the embodiment of the present invention includes an indoor unit 1 that performs heat exchange between a refrigerant and indoor air, being installed indoor, an outdoor unit 50 that performs heat exchange between the refrigerant and outdoor air, being installed outdoor, and a refrigerant pipe 52 that connects the indoor unit 1 and the outdoor unit 50 therethrough.

The outdoor unit 50 compresses the refrigerant and performs heat exchange between the refrigerant and the outdoor air, being installed outdoor. The outdoor unit 50 may include a compressor (not shown) that compresses the refrigerant, an outdoor heat exchanger (not shown) that performs heat exchange between the outdoor air and the refrigerant, an outdoor air blower (not shown) that blows the outdoor air into the outdoor heat exchanger, a gas-liquid separator (not shown) that separates the refrigerant into a gas-phase refrigerant and a liquid-phase refrigerant, an oil separator (not shown) that separates oil from the refrigerant, and an expansion mechanism (not shown) that expands the refrigerant.

Figure 2:
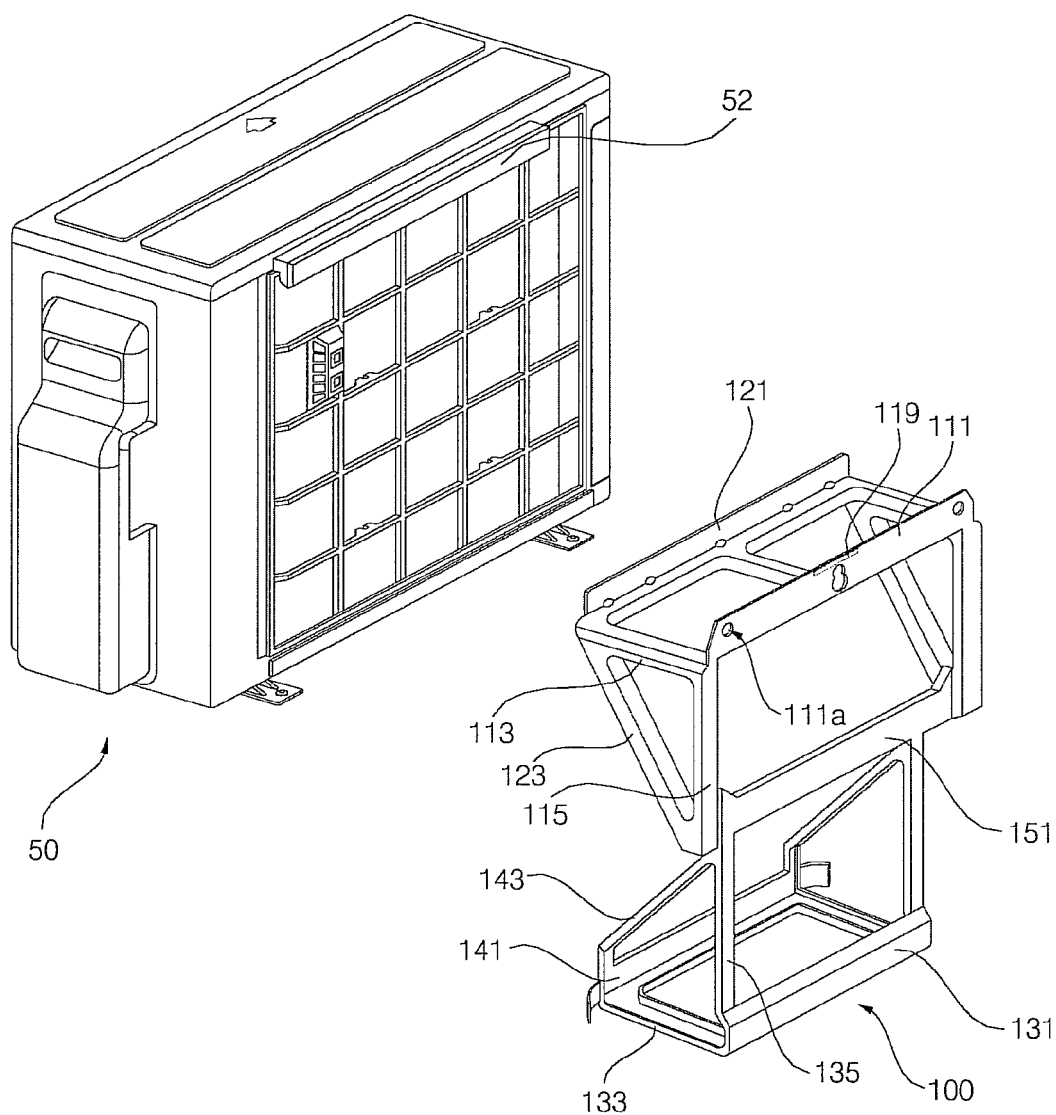
FIG. 2 is a perspective view illustrating an outdoor unit and an outdoor unit bracket according to an embodiment of the present invention.
Figure 3:
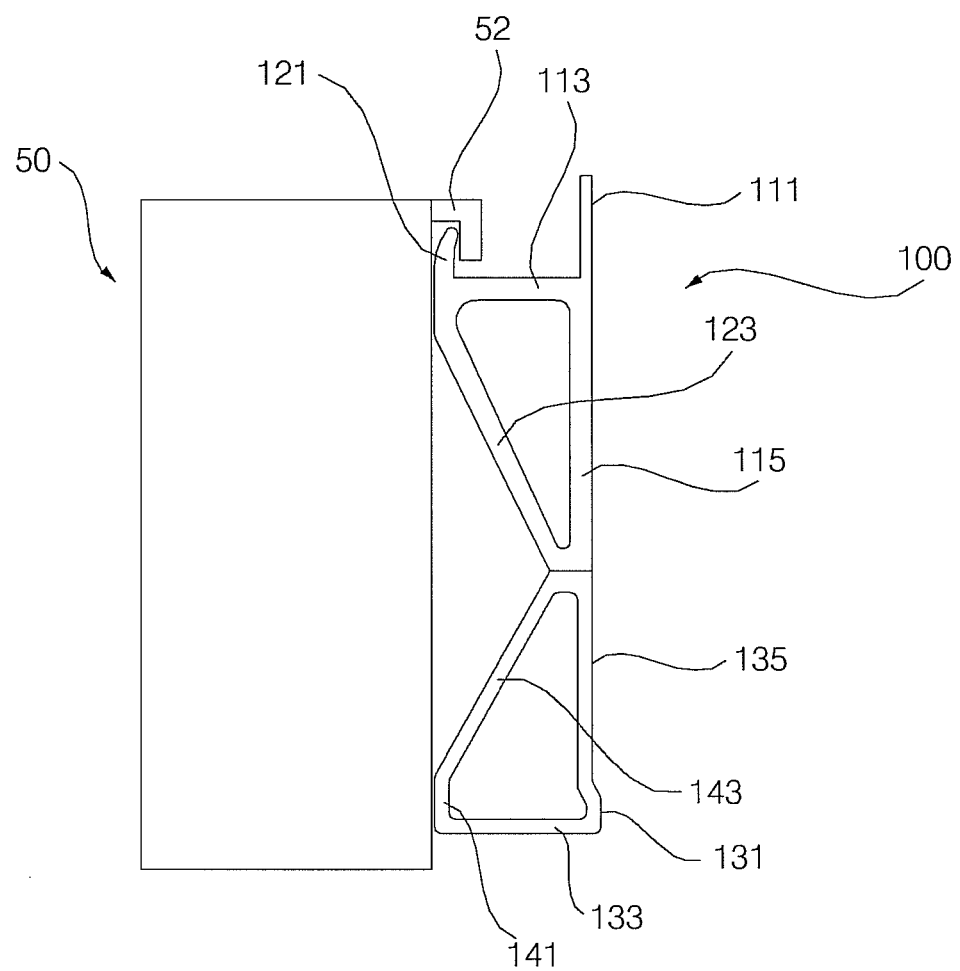
FIG. 3 is a side view illustrating a state in which the outdoor unit and the outdoor unit bracket, shown in FIG. 2, are coupled to each other.

FIG. 2 is a perspective view illustrating an outdoor unit and an outdoor unit bracket according to an embodiment of the present invention. FIG. 3 is a side view illustrating a state in which the outdoor unit and the outdoor unit bracket, shown in FIG. 2, are coupled to each other.

The outdoor unit bracket 100 according to the embodiment of the present invention includes an outer wall coupling portion 111 coupled to an outer wall of a building, an upper supporting portion 121 coupled to a rear upper portion of the outdoor unit 50, being spaced apart from the outer wall coupling portion 111 in a horizontal direction with respect to the outer wall of the building, an outer wall contacting portion 131 contacting the outer wall of the building, being spaced apart from the outer wall coupling portion 111 at a lower portion of the outer wall coupling portion 111, and a lower supporting portion 141 contacting a rear lower portion of the outdoor unit 50, being spaced apart from the outer wall contacting portion 131 in the horizontal direction with respect to the outer wall of the building.

A flange 52 is provided at the rear upper portion of the outdoor unit 50. The flange 52 has a rod shape, and is horizontally disposed at the rear upper portion of the outdoor unit 50. The flange 52 is preferably provided corresponding to a top end of the outdoor unit 50 so that the installation position of the outdoor unit 50 can be easily estimated in the installation of the outer unit bracket 100. The flange 52 is bent in a 'ㄱ' shape so as to be hung on the upper supporting portion 121.

The outer wall coupling portion 111 is coupled to the outer wall of the building. The outer wall coupling portion 111 has a rod shape, and is horizontally disposed. An anchor bolt hole 111a through which an anchor bolt (not shown) passes is formed in the outer wall coupling portion 111. Here, the anchor bolt couples the outer wall coupling portion 111 to the outer wall of the building. In the embodiment of the present invention, three anchor bolt holes 111a are formed in the outer wall coupling portion 111, and a middle anchor bolt hole 111a is preferably formed so that the anchor bolt is first driven into the outer wall of the building and then the outer wall coupling portion 111 can be hung on the anchor bolt through the anchor bolt hole 111a.

A level 119 may be provided to the outer wall coupling portion 111. The level 119 is used to measure a horizontal level, and enables an installer to easily adjust the horizontal level by installing the outer unit bracket 100 while viewing the level 119.

The upper supporting portion 121 is disposed in parallel with the outer wall coupling portion 111, being spaced apart from the outer wall coupling portion 111 in the horizontal direction with respect to the outer wall of the building. The upper supporting portion 121 supports the outer unit 50, being coupled to the flange 52 of the outer unit 50. Preferably, an upper side of the upper supporting portion 121 is slightly bent toward the outer wall coupling portion 111 so that the upper supporting portion 121 is sliding coupled to the flange 52.

The upper supporting portion 121 is connected to the outer wall coupling portion 111 by an upper horizontal connecting portion 113. The upper horizontal connecting portion 113 is preferably provided with a plurality of upper horizontal connecting portions, and three upper horizontal connecting portions are provided in the embodiment of the present invention.

The lower supporting portion 141 is disposed below the upper supporting portion 121, being spaced part from each other. The lower supporting portion 141 supports the outdoor unit 50, contacting the rear lower portion of the outdoor unit 50. The upper supporting portion 121 is coupled to the outdoor unit 50, and thus the lower supporting portion 141 is contacted to the outdoor unit 50 by the self-weight of the outdoor unit 50. Preferably, the lower supporting portion 141 is not directly connected to the upper supporting portion 121.

Both ends of the lower supporting portion 141 are preferably bent toward the outer wall contacting portion 131 so that the outdoor unit 50 is easily sliding coupled to the upper supporting portion 121.

In the outdoor unit bracket 100, the upper supporting portion 121 is coupled to the outdoor unit 50, the lower supporting portion 141 spaced apart from the upper supporting portion 121 contacts the outdoor unit 50, and the upper and lower supporting portions 121 and 141 are spaced apart from each other, being protruded from the outer wall of the building. Accordingly, the outdoor unit bracket 100 is stable, and noise is reduced in the operation of the outdoor unit 50.

The outer wall contacting portion 131 is provided below the outer wall coupling portion 111, being spaced apart from the outer wall coupling portion 111. The outer wall contacting portion 131 contacts the outer wall of the building. The upper supporting portion 121 is coupled to the outdoor unit 50, and thus the outer wall contacting portion 131 is contacted to the outer wall of the building by the self-weight of the outdoor unit 50.

The outer wall contacting portion 131 is connected to the lower supporting portion 141 by a lower horizontal connecting portion 133. The lower horizontal connecting portion 133 is preferably provided with a plurality of lower horizontal connecting portions, and two lower horizontal connecting portions are provided in the embodiment of the present invention.

A middle connecting portion 151 is disposed in parallel between the outer wall coupling portion 111 and the outer wall contacting portion 131. Preferably, the middle connecting portion 151 does not directly contact the outer wall of the building. The middle connecting portion 151 is connected to the outer wall coupling portion 111 by an upper middle connecting portion 115. The middle connecting portion 151 is connected to the outer wall contacting portion 131 by a middle lower connecting portion 135.

The upper supporting portion 121 and the middle connecting portion 151 are connected by an upper diagonal connecting portion 123. The upper diagonal connecting portion 123 efficiently distributes and supports the load of the outdoor unit 50, being diagonally disposed.

The lower supporting portion 141 and the middle connecting portion 151 are connected by a lower diagonal connecting portion 143. The lower diagonal connecting portion 143 efficiently distributes and supports the load of the outdoor unit 50, being diagonally disposed.

When the outdoor unit bracket 100 is viewed from the side, triangle-shaped frames are symmetrically formed at upper and lower sides, respectively, so that the load of the outdoor unit 50 can be efficiently supported.

Figure 4:
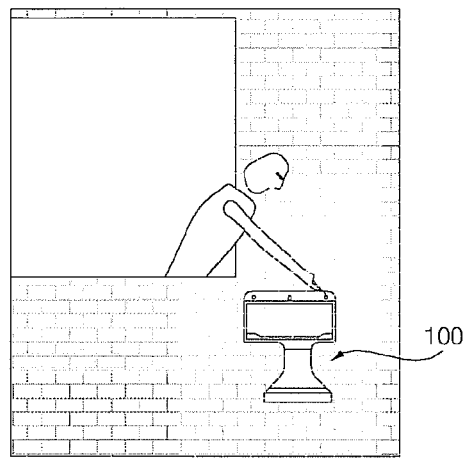
FIG. 4 is a view illustrating an order in which an outdoor unit is installed according to an embodiment of the present invention.
Figure 4:
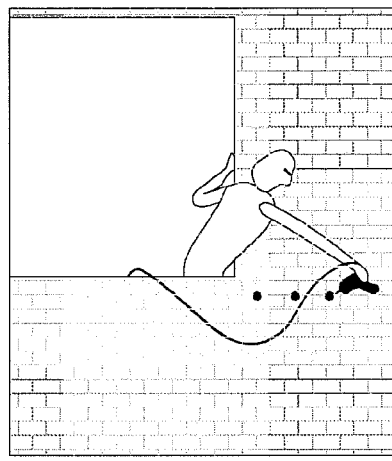
Figure 4:
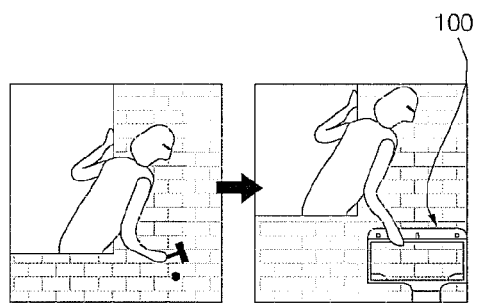
Figure 4:
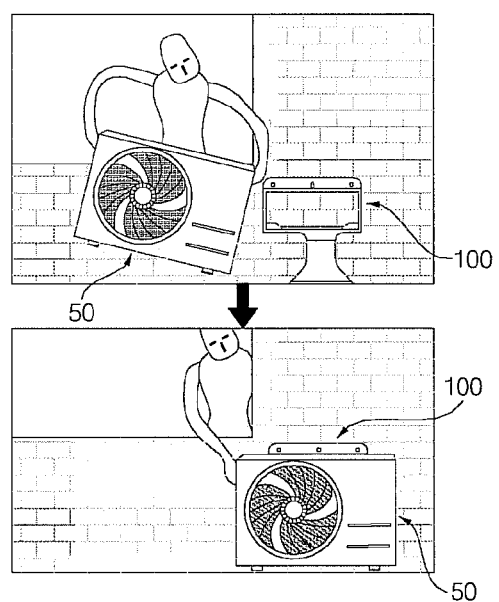

FIG. 4 is a view illustrating an order in which an outdoor unit is installed according to an embodiment of the present invention.

An installer confirms an installation position by estimating an outer wall of a building, to which the outdoor unit bracket is to be attached. Since the top end of the outdoor unit bracket 100 is almost correspond to that of the outdoor unit 50, a user confirms the installation position by considering that the top end of the outdoor unit bracket 100 is almost correspond to that of the outdoor unit 50. The installer adjusts the horizontal level of the outdoor unit bracket 100 by confirming the level 119.

The installer sets the installation position of the outdoor unit bracket 100, and marks a point at which the anchor bolt is driven into the outer wall of the building through the anchor bolt hole 111a as shown in FIG. 4(a).

The installer punches the marked point as shown in FIG. 4(b). In the embodiment of the present invention, since the three anchor bolts are driven in the outer wall of the building, the installer punches three points.

As shown in FIG. 4(c), the installer drives the anchor bolt at the middle one of the three punched points. After the middle anchor bolt is driven, the installer hangs the anchor bolt on the middle anchor bolt hole 111a of the outer wall coupling portion 111, and drives the other anchor bolts through the other anchor bolt holes 111a.

If the driving of the anchor bolts is completed, the installer mounts the outdoor unit 50 on the outdoor unit bracket 100 by coupling the flange 52 of the outdoor unit 50 to the upper supporting unit 121 of the outdoor unit bracket 100 as shown in FIG. 4(d). The installer couples the outdoor unit 50 to the outdoor unit bracket 100 by sliding the flange 52 of the outdoor unit 50 along the upper supporting portion 121 of the outdoor unit bracket 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modified embodiments should not be understood as being separate from the technical spirit or scope of the present invention, but should be interpreted as being included in the accompanying claims of the present invention.

According to the outdoor unit bracket and the outdoor unit comprising the same of the present invention, one or more effects can be obtained as follows.

First, since only the upper side of the outdoor unit bracket is coupled to an outer wall of a building, it is easy to perform a punching operation on the outer wall of the building.

Second, the horizontal level can be easily adjusted using the level provided at the upper side of the outdoor unit bracket.

Third, when the outdoor unit bracket is installed on the outer wall of the building, the installation position of the outdoor unit can be easily estimated.

Fourth, since the outdoor unit bracket supports upper and lower portions of the outdoor unit, the outdoor unit bracket is stable, and noise is reduced.

Fifth, since the upper portion of the outdoor unit is simply hung on the outdoor unit bracket in the mounting of the outdoor unit, the installation is simple and safe.

The effects of the present invention are not limited to the above-described effects and other effects which are not described herein will become apparent to those skilled in the art from the accompanying claims.

What is claimed is:

1. An outdoor device bracket for supporting an outdoor device of an air conditioner, configured to be installed on an outer wall of a building, comprising:
    an outer wall coupling portion configured to be coupled to the outer wall of the building;
    an upper supporting portion configured to be coupled to a rear upper portion of the outdoor device, wherein the upper supporting portion is spaced apart from the outer wall coupling portion in a horizontal direction;
    an outer wall contacting portion configured to contact the outer wall of the building due to a weight of the outdoor device, wherein the outer wall contacting portion is spaced apart from the outer wall coupling portion in a vertical direction;
    a lower supporting portion configured to contact a rear lower portion of the outdoor device due to the weight of the outdoor device, wherein the lower supporting portion is spaced apart from the outer wall contacting portion in the horizontal direction; and
    a middle connecting portion provided between the outer wall coupling portion and the outer wall contacting portion, wherein the middle connecting portion extends in parallel to the outer wall coupling portion and the outer wall contacting portion, wherein a contacting portion of the outer wall contacting portion, which contacts the outer wall, protrudes towards the outer wall as compared to the outer wall coupling portion, wherein an upper end of the upper supporting portion is bent toward the outer wall coupling portion so that the upper end can be slidingly coupled to a flange provided at the rear upper portion of the outdoor device, wherein both side ends of the lower supporting portion are bent toward the outer wall contacting portion so that the outdoor device can be slidingly coupled to the upper supporting portion, and wherein the middle connecting portion is configured such that the middle connection portion does not contact the outer wall of the building when the outer wall contacting portion contacts the outer wall of the building.

2. The outdoor device bracket of claim 1, wherein the outer wall coupling portion has a rod shape.

3. The outdoor device bracket of claim 1, wherein an anchor bolt hole, through which an anchor bolt passes, is formed in the outer wall coupling portion, and the anchor bolt couples the outer wall coupling portion to the outer wall of the building.

4. The outdoor device bracket of claim 1, further comprising a level measuring a horizontal level, wherein the level is provided to the outer wall coupling portion.

5. The outdoor device bracket of claim 1, wherein the upper supporting portion, the lower supporting portion, the outer wall coupling portion, and the outer wall contacting portion are provided in parallel with one another.

6. The outdoor device bracket of claim 5, further comprising:
    an upper diagonal connecting portion that connects the upper supporting portion and the middle connecting portion; and
    a lower diagonal connecting portion that connects the lower supporting portion and the middle connecting portion.

7. The outdoor device bracket of claim 5, further comprising:
    an upper horizontal connecting portion that connects the outer wall coupling portion and the upper supporting portion; and
    a lower horizontal connecting portion that connects the outer wall coupling portion and the lower supporting portion.

8. An outdoor device, comprising:
    an outdoor device main body that performs heat exchange between outdoor air and a refrigerant;
    a flange provided at a rear upper portion of the outdoor device main body; and
    the outdoor device bracket of claim 1, wherein the outdoor device bracket supports the outdoor device main body, wherein the upper supporting portion of the outdoor device bracket is coupled to the flange and the lower supporting portion of the outdoor device bracket supports the outdoor device main body while contacting a rear lower portion of the outdoor device main body.

9. The outdoor device of claim 8, wherein the outdoor device bracket is mounted on the outer wall of the building.

10. The outdoor device of claim 8, wherein an anchor bolt hole, through which an anchor bolt passes, is formed in the outer wall coupling portion, and the anchor bolt couples the outer wall coupling portion to the outer wall of the building.

11. The outdoor device of claim 8, further comprising a level that measures a horizontal level, wherein the level is provided to the outer wall coupling portion.

12. The outdoor device of claim 8, wherein the upper supporting portion, the lower supporting portion, the outer wall coupling portion and the outer wall contacting portion are disposed in parallel with one another.

* * * * *